US010128757B2

(12) United States Patent
Unno

(10) Patent No.: US 10,128,757 B2
(45) Date of Patent: Nov. 13, 2018

(54) BUCK-BOOST CONVERTER WITH SMALL DISTURBANCE AT MODE TRANSITIONS

(71) Applicant: Dialog Semiconductor (UK) Limited, London (GB)

(72) Inventor: Naoyuki Unno, Kanagawa (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/448,881

(22) Filed: Mar. 3, 2017

(65) Prior Publication Data
US 2018/0254704 A1    Sep. 6, 2018

(51) Int. Cl.
*H02M 3/158* (2006.01)
(52) U.S. Cl.
CPC ................... *H02M 3/1582* (2013.01)
(58) Field of Classification Search
CPC ..... H02M 3/1582; H02M 3/156; H02M 3/158
USPC ....... 323/242, 259, 282, 283, 284, 285, 288, 323/344
See application file for complete search history.

(56) References Cited

U.S. PATENT DOCUMENTS

| | | | |
|---|---|---|---|
| 6,037,755 A | 3/2000 | Mao et al. | |
| 6,127,815 A * | 10/2000 | Wilcox | G05F 1/565 323/282 |
| 6,166,527 A | 12/2000 | Dwelley et al. | |
| 7,495,423 B1 * | 2/2009 | Knight | H02M 3/1588 323/259 |
| 7,518,346 B2 | 4/2009 | Prexl et al. | |
| 7,755,342 B2 | 7/2010 | Chen et al. | |
| 8,330,435 B2 | 12/2012 | Qiu et al. | |
| 8,860,387 B2 | 10/2014 | Kobayashi | |
| 9,712,047 B2 * | 7/2017 | Zhang | H02M 1/4225 |
| 2006/0055384 A1 | 3/2006 | Jordan et al. | |
| 2009/0146630 A1 * | 6/2009 | Naka | H02M 1/38 323/283 |
| 2011/0043172 A1 | 2/2011 | Dearn | |
| 2012/0032658 A1 * | 2/2012 | Casey | H02M 3/1582 323/271 |

(Continued)

FOREIGN PATENT DOCUMENTS

| | | |
|---|---|---|
| EP | 2 378 649 | 10/2011 |
| JP | 2005 045943 | 2/2005 |

OTHER PUBLICATIONS

European Search Report, Application No. 13368010.8-1804, Applicant: Dialog Semiconductor GmbH, dated Oct. 24, 2013, 6 pgs.

(Continued)

*Primary Examiner* — Alex Torres-Rivera
(74) *Attorney, Agent, or Firm* — Saile Ackerman LLC; Stephen B. Ackerman

(57) ABSTRACT

The disclosure describes decreasing the overshoot and undershoots during the mode transitions of a Buck-Boost switching converter, without causing mode bounces. This is achieved by a main compensation capacitor of an error amplifier being charged or discharged, so that the output voltage level is shifted close to the target value. The expected behavior of the disclosure is contributed to two items, one is a mode transition detector, configured to detect mode transition among buck, buck-boost, boost, and ½f buck/boost modes, and the other is charge/discharge circuitry configured within one-clock cycle of a mode transition being detected.

21 Claims, 11 Drawing Sheets

(56) References Cited

U.S. PATENT DOCUMENTS

| | | | |
|---|---|---|---|
| 2012/0146594 A1 | 6/2012 | Kobayashi | |
| 2012/0175963 A1* | 7/2012 | Adest | H02J 1/102 307/82 |
| 2012/0229110 A1 | 9/2012 | Huang et al. | |
| 2014/0266085 A1* | 9/2014 | Unno | H02M 3/04 323/234 |
| 2015/0180335 A1* | 6/2015 | Takada | H02M 3/156 323/288 |
| 2016/0105110 A1* | 4/2016 | Houston | H02M 3/1582 323/271 |

OTHER PUBLICATIONS

"Σ-Δ Modulated Digitally Controlled Non-Inverting Buck-Boost Converter for WCDMA RF Power Amplifiers," by Rajarshi Paul et al., Applied Power Electronics Conference and Exposition, 2009. APEC 2009. Twenty-Fourth Annual IEEE, Feb. 2009, pp. 533-539.
Co-pending U.S. Appl. No. 13/847,574, filed Mar. 20, 2013, "A Control Method of High Efficient Buck-Boost Switching Regulator," by Naoyuki Unno, 27 pgs.

\* cited by examiner

BUCK-BOOST CONVERTER WITH SMALL DISTURBANCE AT MODE TRANSITIONS

BACKGROUND OF THE INVENTION

Field of the Invention

The disclosure relates generally to a DC-DC switching power converter, employing a pulse-width modulation (PWM) control signal and different modes of operation.

Description of Related Art

The Buck-Boost switching converter is a type of DC-DC switching converter that has an output voltage magnitude that is either greater than or less than the input voltage magnitude. It is a switch mode power supply with a similar circuit topology to the Buck switching converter and the Boost switching converter. The output voltage is adjustable based on the duty cycle of the switching transistor.

FIG. 1a shows a prior art Buck-Boost switching configuration having 1 inductor and 4 switches, of U.S. application Ser. No. 13/847,574, owned by a common assignee, and herein incorporated by reference in its entirety. Switches S1-S4 are usually realized by transistors. While in the on-state, S1 and S3 are closed (on) and the input voltage source is connected to the inductor L. This results in accumulating energy in L. In this stage, the capacitor Cout supplies energy to the output load. While in the off-state, S2 and S4 are closed (on) and the inductor L is connected to the output load and capacitor Cout, so energy is transferred from L to Cout and Load. The characteristics of the Buck-Boost switching converter are mainly that the output voltage can vary continuously from 0 to ∞ (for an ideal converter), compared to the output voltage varying from 0 to Vin and Vin to ∞, for a Buck and a Boost switching converter.

The classical Buck-Boost switching control uses only one PWM control signal and employs only one mode of operation. It suffers poor conversion efficiency due to its high switch driving loss and high inductor current requirement.

One example of the prior art, U.S. Pat. No. 6,166,527 (Dwelley et. al), employs three different modes of operation, which are Buck, Buck-Boost, and Boost switching modes, by using more than one PWM control signal to improve the efficiency.

Another example is U.S. Pat. No. 8,860,387 (Kobayashi), also owned by a common assignee, and herein incorporated by reference in its entirety, employs five modes of operation, which are Buck, half-frequency (fsw/2) Buck, fsw/2 Buck-Boost, fsw/2 Boost, and Boost switching modes. This system has the ability to reduce the switching frequency in half and improve the efficiency when the input voltage is close to the output voltage while maintaining regulation performance.

These Buck-Boost switching converters using different operation modes might have a mode bounce issue, which occurs at the transition of two switching modes. If mode bounce occurs, the converter goes back and forth between two operation modes and is unstable. As a result, the output voltage suffers from significant ripples and the efficiency is degraded.

FIGS. 1b & 1c illustrate relationship 100 between input voltage and error amplifier output, for constant output voltage and different modes of operation of a Buck-Boost DC-DC switching converter, of the prior art. Buck, Buck-Boost, and Boost switching modes are illustrated in the waveform of FIG. 1b and Buck, half-frequency (fsw/2) Buck, fsw/2 Buck-Boost, fsw/2 Boost, and Boost switching modes are illustrated in the waveform of FIG. 1c. What is shown is that one way to avoid mode bounce is to add an offset voltage on the error amplifier output when the operation mode changes. This offset voltage generates hysteresis of the input voltage threshold for mode transitions. Larger offset voltage decreases mode bounce likelihood, but causes a larger output disturbance during the transition.

FIG. 2 illustrates behavior 200 of output voltage and error amplifier output, at a mode transition of a Buck-Boost DC-DC switching converter, of the prior art. When the input voltage crosses a threshold, mode transition occurs. Error amplifier output 210 is shown with a given offset voltage, causing undershoot during mode transition on output voltage 220.

Another example of the prior art employs a hysteresis at the error amplifier output, as disclosed in U.S. application Ser. No. 13/847,574. FIG. 3 shows relationship 300 between input voltage and error amplifier output, with hysteresis of the error amplifier output during mode transition of a Buck-Boost DC-DC switching converter. Increasing the error amplifier output voltage range for the present operating mode of Buck, Buck-Boost or Boost generates hysteresis. However some offset voltage on the error amplifier output is still needed, when the mode transition occurs, resulting in some overshoot and undershoots until the error amplifier output settles at the proper voltage level. If a mode transition occurs during load and/or line transient, the overshoot and undershoots become larger.

SUMMARY OF THE INVENTION

An object of the disclosure is to provide a Buck-Boost switching power converter, with reduced output voltage disturbance during mode transitions among operation regions of the switching power converter.

Further, another object of this disclosure is a Buck-Boost switching power converter, with reduced mode bounce between two operation modes, and smaller overshoot and undershoot voltage at switching converter output.

Still further, another object of this disclosure is a Buck-Boost switching power converter, which maintains the frequency characteristic of the control loop of the switching power converter.

To accomplish the above and other objects, a Buck-Boost switching power converter is disclosed, comprising a mode transition detector, configured to monitor Buck and Boost pulse-width modulation (PWM) input signals, an error amplifier, a main compensation capacitor, at an output of the error amplifier, and charge and discharge circuitry configured to charge or discharge the main compensation capacitor during a mode transition, based on detection of the mode transition by the mode transition detector. The switching converter further comprises digital logic gates configured to detect a mode transition between the PWM input signals. The switching converter still further comprises a pulse signal generator configured to skip or regenerate the PWM input signals, during the mode transition, and to output a pulse having a signal width of one clock cycle.

The above and other objects are further achieved by a method for operating a Buck-Boost switching converter. The steps include monitoring Buck and Boost pulse-width modulation (PWM) input signals to detect a mode transition. An error amplifier, and a main compensation capacitor at an output of the error amplifier, is provided. Charging or discharging the main compensation capacitor during a mode transition, based on detection of the mode transition, is provided.

In various embodiments, the function may be achieved by a Buck-Boost switching converter operating in Buck, Buck-Boost, and Boost switching modes.

In various embodiments, the function may be achieved by a Buck-Boost switching converter operating in Buck, half-frequency Buck, half frequency Buck-Boost, half frequency Boost, and Boost switching modes.

In various embodiments, the function may be achieved by a Buck-Boost switching converter, where a feed-forward, low gain, fast path is connected across the error amplifier inputs and a feed-forward capacitor, and a feed-forward resistor is connected across the main compensation capacitor and the feed-forward capacitor.

DETAILED DESCRIPTION OF THE INVENTION

The disclosure provides for the decreasing of overshoot and undershoots during the mode transitions of a Buck-Boost switching converter, without causing mode bounces. This is achieved by a main compensation capacitor of the error amplifier being charged or discharged within one clock cycle, so that the output voltage level is shifted close to the target value. The expected behavior of the disclosure is due to a mode transition detector, and a charge and discharge circuit of an error amplifier output.

Figure 1A:
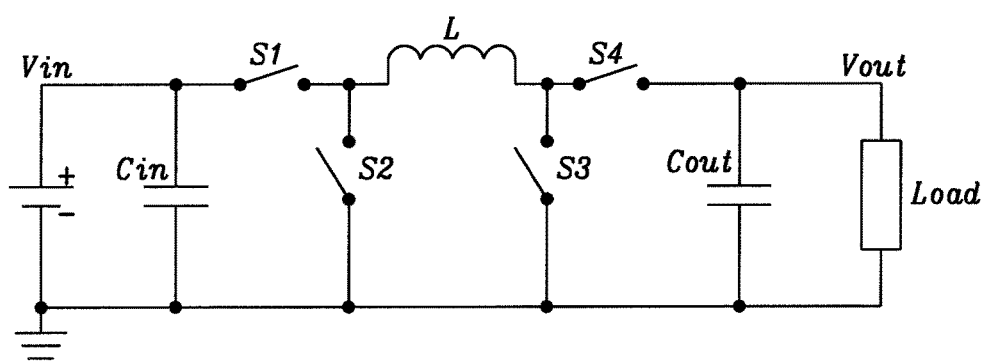
FIG. 1a shows a prior art Buck-Boost switching configuration having 1 inductor and 4 switches.
Figure 1B:
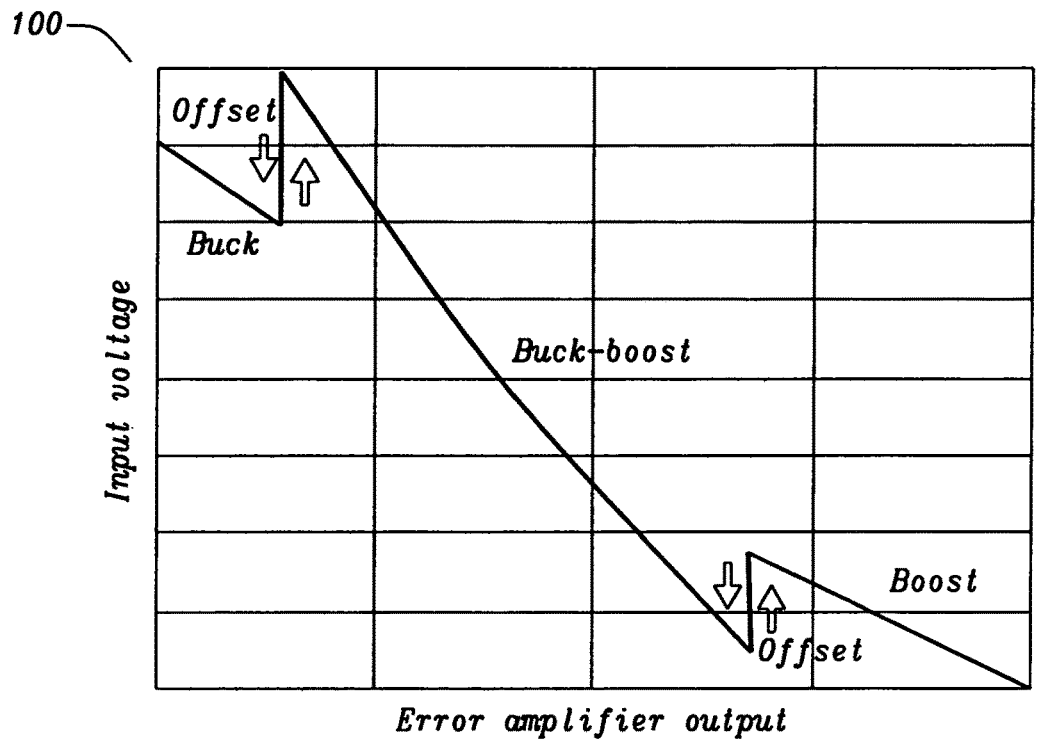
FIGS. 1b & 1c illustrate the relationship between input voltage and error amplifier output, for constant output voltage and different modes of operation of a Buck-Boost DC-DC switching converter, of the prior art.
Figure 1C:
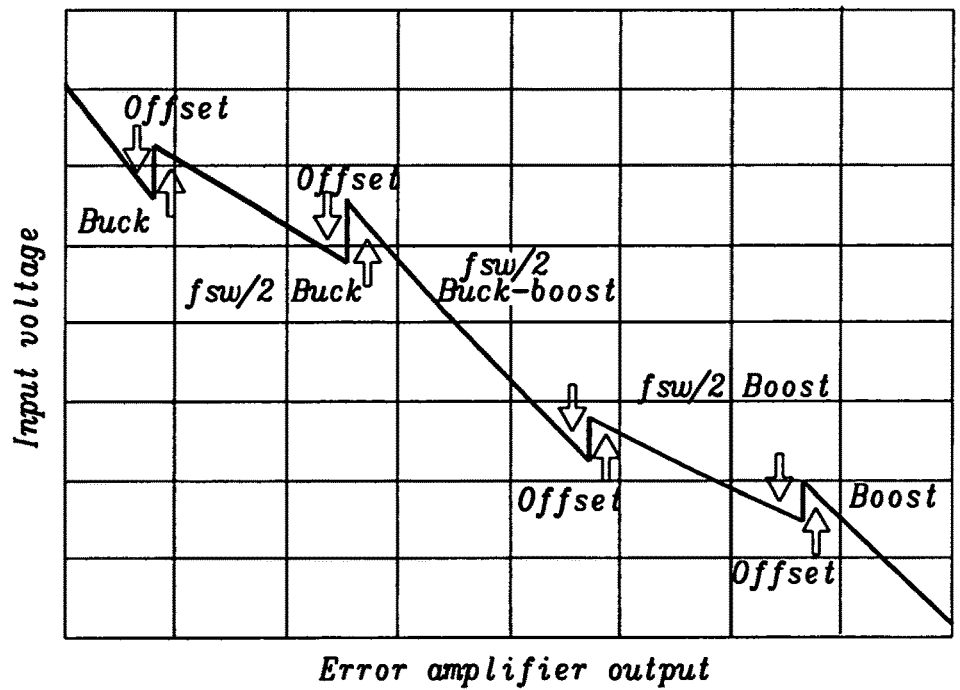
Figure 2:
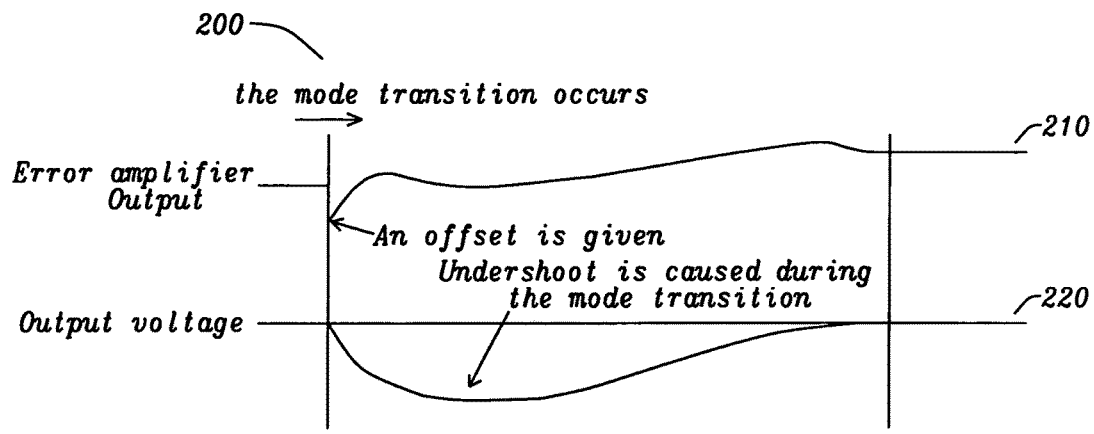
FIG. 2 illustrates the behavior of output voltage and error amplifier output, at a mode transition of a Buck-Boost DC-DC switching converter, of the prior art.
Figure 3:
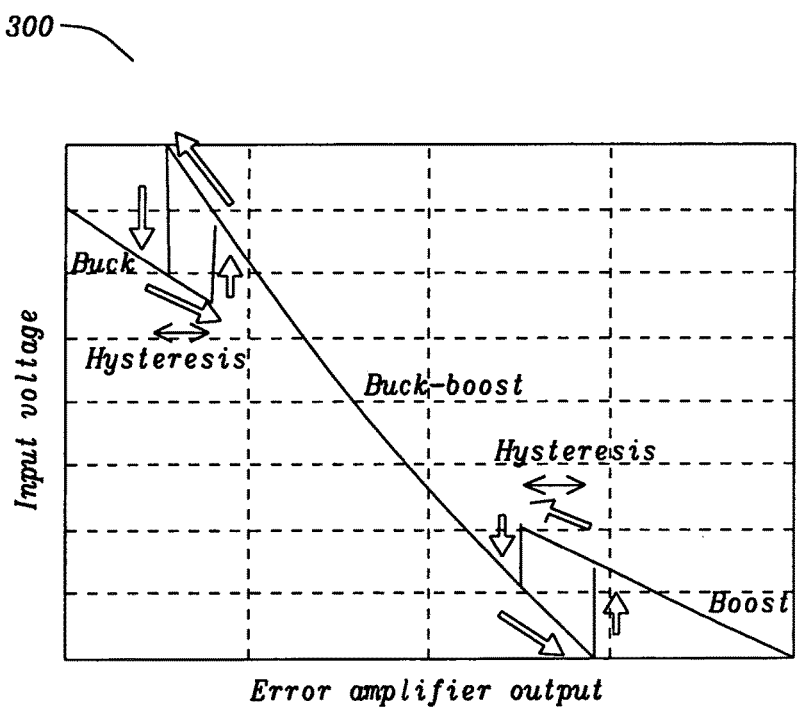
FIG. 3 shows the relationship between input voltage and error amplifier output, with hysteresis of the error amplifier output during mode transition of a Buck-Boost DC-DC switching converter, of the prior art.
Figure 4A:
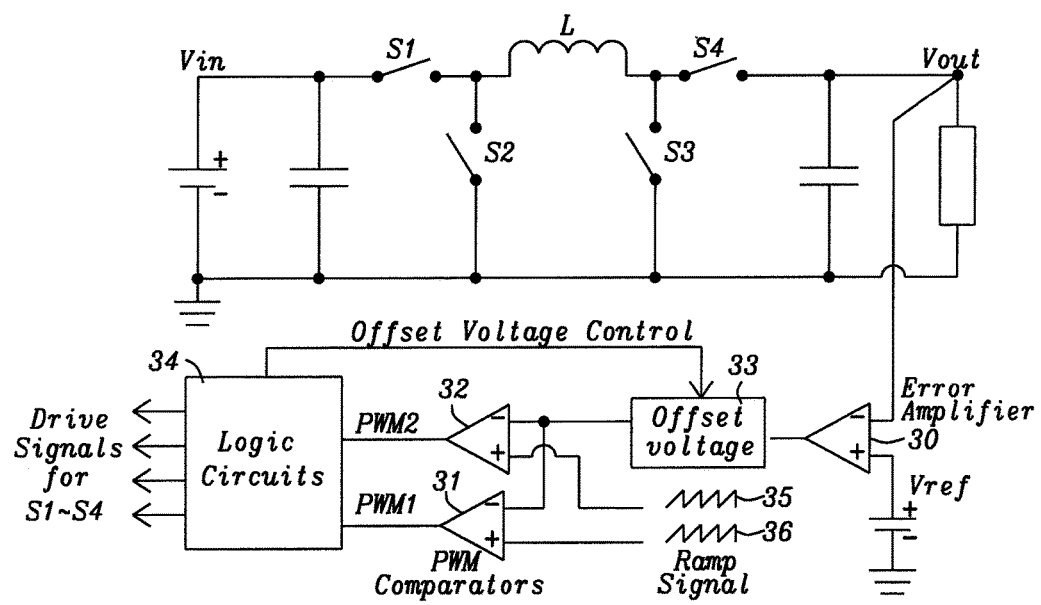
FIG. 4a shows a circuit implementation, where the adding of two offset voltages in ramp signals, or PWM comparators, enables the halving of the switching frequency.

FIG. 4a shows a circuit implementation, as disclosed in U.S. Pat. No. 8,860,387, where the adding of two offset voltages in ramp signals, or PWM comparators, enables the halving of the switching frequency. The circuit includes a switching configuration having 1 inductor and 4 switches, where Vout is the inverting input of Error Amplifier 30 and Vref the non-inverting input. The error amplifier determines Offset Voltage 33, which is the inverting input to PWM comparators 31 and 32. Ramp Signals 35 and 36 supply the non-inverting inputs to the comparators. Comparator outputs PWM1 and PWM2 drive Logic Circuits 34, which provide the drive signals for switches S1 through S4. Offset Voltage Control, from Logic Circuits 34, is input to Offset Voltage 33. Inputs Vout and Vref, of FIG. 4a, are the inputs of Error Amplifier 30, in FIGS. 7a & 7b of the disclosure, to be described later.

In FIG. 4a, the Buck-Boost switching converter operation/control can be divided into 5 modes, which are Buck, half frequency Buck, Buck-Boost, half frequency Boost, and Boost mode. In Buck and half frequency Buck mode, switch S3 is continuously off and switch S4 is continuously on, creating a Buck topology. The difference between Buck and half frequency Buck mode is the reduced switching frequency of the half frequency Buck mode. In the half frequency Buck mode the converter operates with half switching frequency, compared to the Buck mode. In Boost and half frequency Boost mode, switch S1 is continuously on and switch S2 is continuously off, thus creating a Boost topology. In half frequency Boost mode the converter switches in half frequency, compared to the Boost mode. In Buck-Boost mode, the pair of switches S1 and S2, and the pair of switches S3 and S4, are both switching with different PWM signals. The frequency is also half in the Buck-Boost mode, compared to Buck or Boost mode. When the input and output voltage are close together, the switching frequency is reduced to half of the original frequency, so the driving loss of the switches is significantly reduced.

Figure 4B:
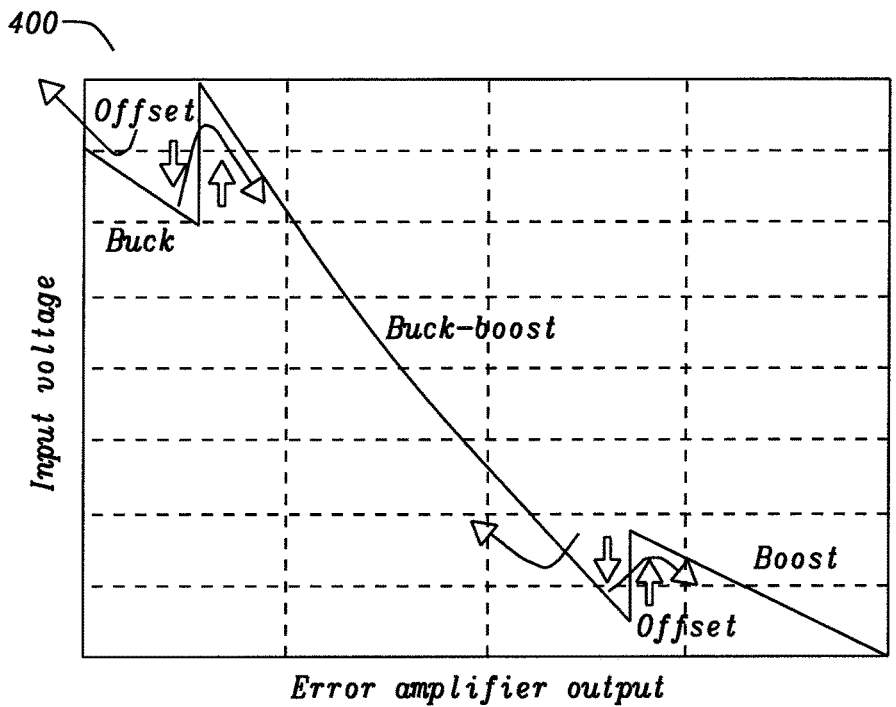
FIGS. 4b & 4c illustrate the error amplifier output accelerated to the proper voltage level when the mode transition is detected, so that the output voltage level is shifted close to the target, embodying the principles of the disclosure.
Figure 4C:
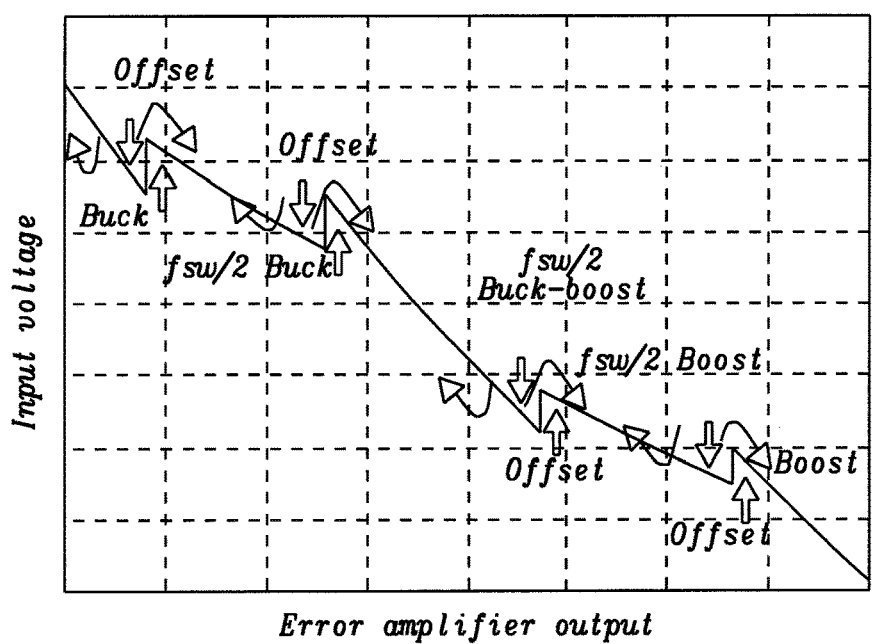

FIGS. 4b & 4c illustrate 400, the error amplifier output accelerated to the proper voltage level when the mode transition is detected, so that the output voltage level is shifted close to the target. Buck, Buck-Boost, and Boost switching modes are illustrated in waveform FIG. 4b. Buck, half-frequency (fsw/2) Buck, fsw/2 Buck-Boost, fsw/2 Boost, and Boost switching modes are illustrated in waveform FIG. 4c, for a Buck-Boost switching converter operating in five different modes, as seen in related art U.S. Pat. No. 8,860,387. The decreasing of the overshoot and undershoots during mode transitions, with no mode bounce or hysteresis, is shown. This is the case when the main compensation capacitor of the error amplifier of the disclosure is charged or discharged, within one clock cycle.

Figure 5:
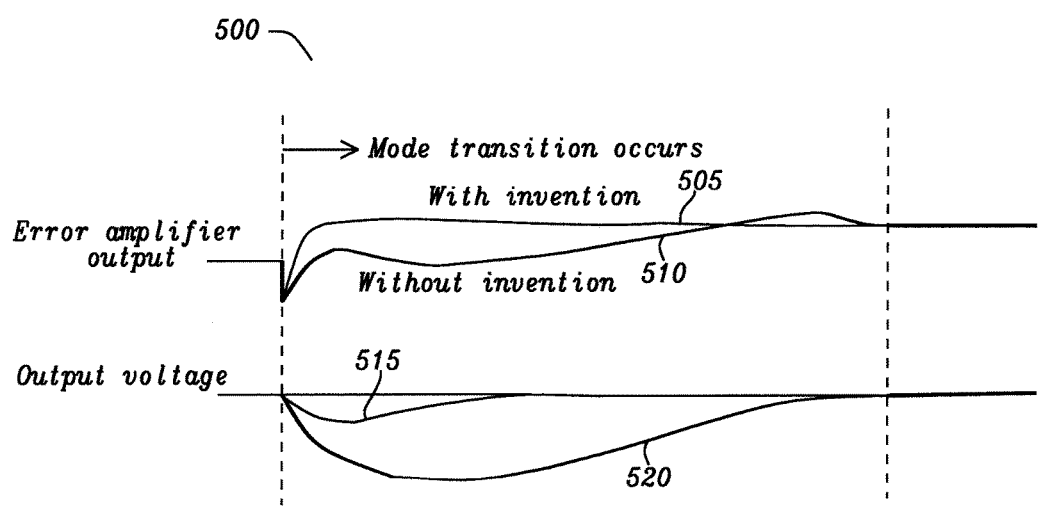
FIG. 5 shows the behavior of the output voltage and the error amplifier output, at a mode transition, embodying the principles of the disclosure.

FIG. 5 shows behavior 500 of the output voltage and the error amplifier output, at a mode transition. When the input voltage crosses a threshold, mode transition occurs. Error amplifier output 510 is shown with a given offset voltage, causing undershoot, during mode transition, on output voltage 520, when the disclosure is not implemented. Error amplifier output 505 is shown with a given offset voltage with a minimal undershoot, during mode transition, on output voltage 515. This is the case when the disclosure causes the output voltage level to be shifted close to the target value.

Figure 6:
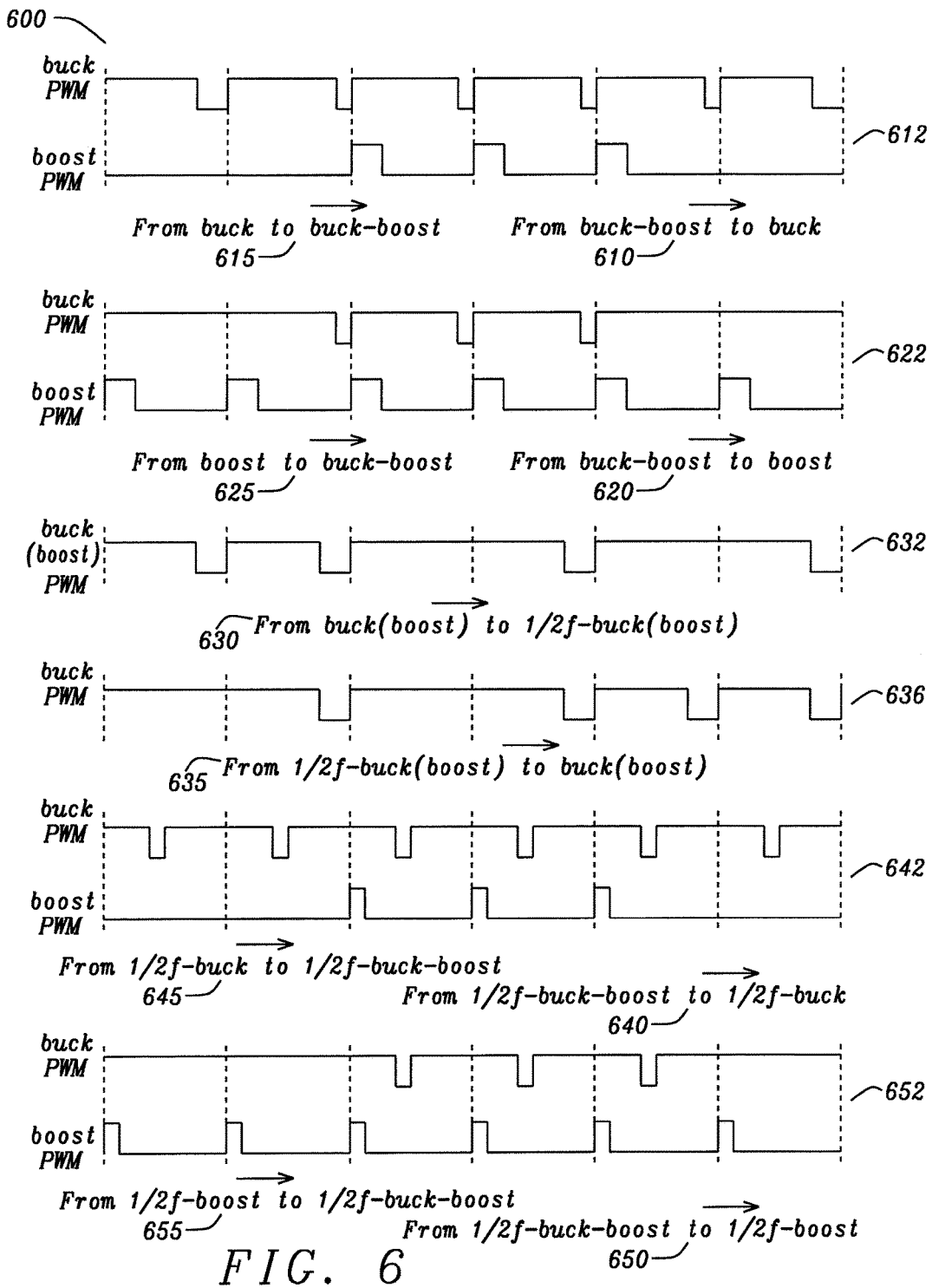
FIG. 6 illustrates the pulse-width modulation (PWM) signal conditions to define mode transitions, embodying the principles of the disclosure.

FIG. 6 illustrates pulse-width modulation (PWM) signal conditions 600 to define mode transitions. A first set of signals 612 illustrates mode transitions between Buck mode and Buck-Boost mode. When the Boost PWM signal is skipped or Boost is fully off, because its width is narrower than the minimum width, the Buck PWM signal is generated, and this is considered a mode transition from Buck-Boost to Buck, as shown in 610. When the Boost PWM signal is generated, after being fully off in the previous cycle when skipped, this is considered mode transition from Buck to Buck-Boost, as shown in 615.

A second set of signals 622 illustrates mode transitions between Boost mode and Buck-Boost mode. When the Buck PWM signal is skipped or Buck is fully on, because its width is narrower than the minimum width, and the Boost PWM signal is generated, this is considered a mode transition from Buck-Boost to Boost, as shown in 620. When the Buck PWM signal is generated, after being fully off in the previous cycle, this is considered mode transition from Boost to Buck-Boost, as shown in 625.

A third set of signals 632 and 636 illustrates mode transitions between ½f Buck(Boost) to 1f Buck(Boost) mode. When the Buck(Boost) PWM signal is skipped after being on in the previous two cycles, this is considered a mode transition from 1f Buck(Boost) to ½f Buck(Boost), as shown in 630, where 1f is full frequency and ½f is half frequency. When the Buck(Boost) PWM signal is generated in two consecutive cycles, after being skipped in the previous cycle, this is considered mode transition from ½f Buck(Boost) to 1f Buck(Boost), as shown in 635, where ½f is half frequency and 1f is full frequency.

A fourth set of signals 642 illustrates mode transitions between ½f Buck to ½f Buck-Boost mode. When the ½f Boost PWM signal is skipped, because its width is narrower than the minimum width, the ½f Buck PWM signal is generated, and this is considered a mode transition from ½f Buck-Boost to ½f Buck, as shown in 640. When the ½f Boost PWM signal is generated, after being fully off in the previous cycle, this is considered mode transition from ½f Buck to ½f Buck-Boost, as shown in 645.

A fifth set of signals 652 illustrates mode transitions between ½f Boost to ½f Buck-Boost mode. When the ½f Buck PWM signal is skipped, because its width is narrower than the minimum width, and the ½f Boost PWM signal is generated, this is considered a mode transition from Y2f Buck-Boost to ½f Boost, as shown in 650. When the ½f Buck PWM signal is generated, after being fully off in the previous cycle, this is considered as mode transition from ½f Boost to ½f Buck-Boost, as shown in 655.

Figure 7A:
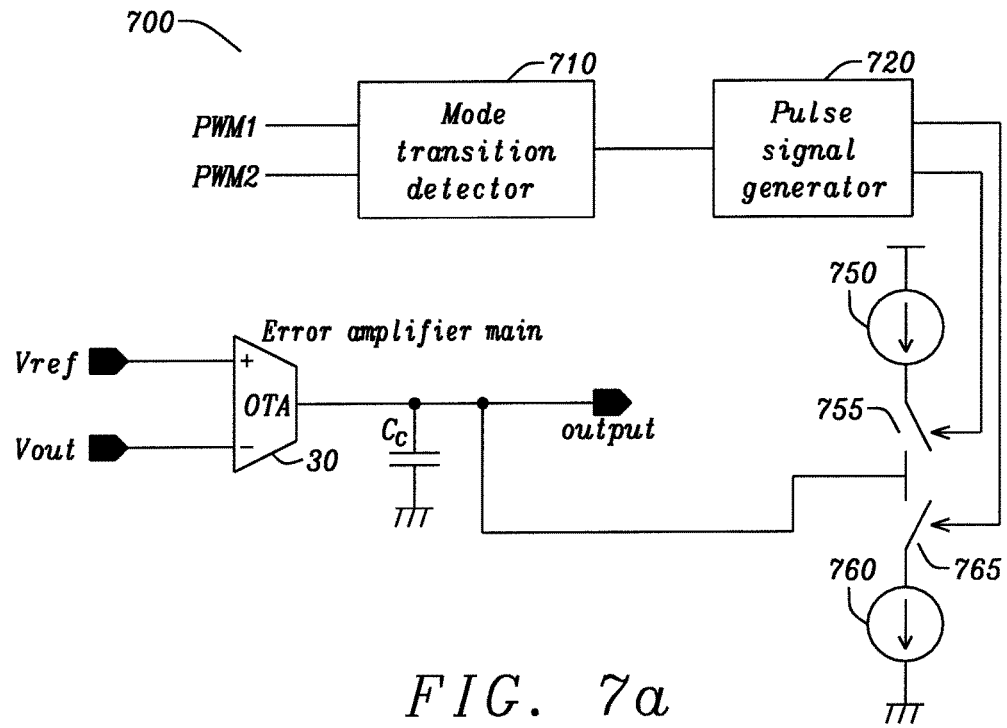
FIG. 7a illustrates a preferred embodiment of the disclosure, for controlling the main compensation capacitor Cc of the Error Amplifier 30.

FIG. 7a illustrates 700, a preferred embodiment of the disclosure, for controlling the main compensation capacitor Cc of the Error Amplifier 30. Important elements include the mode transition detector 710, and charge/discharge circuitry, where the proposed mode transition detector 710 is composed of digital logic gates. The logic circuitry monitors the Buck and Boost PWM input signals, and detect skipping or regeneration of these signals, to determine which of the various mode transitions shown in FIG. 6 have occurred. The mode transition detector logic determines if a mode transition occurs, causing a pulse to be generated by pulse signal generator 720.

The charge and discharge circuitry comprises PMOS current source 750, NMOS current source 760, and control switches for the current sources, 755 and 765, respectively. Error Amplifier 30 comprises an operational transconductance amplifier (OTA), and receives non-inverting input Vref and inverting input Vout, and supplies main compensation capacitor Cc. The output the error amplifier is connected to the charge and discharge circuitry, and the output is input to offset voltage 33, which supplies the PWM comparators. Reference voltage Vref, feedback output voltage Vout, and input signals PWM1 and PWM2 correspond to signals of the same name in FIG. 4a.

Figure 7B:
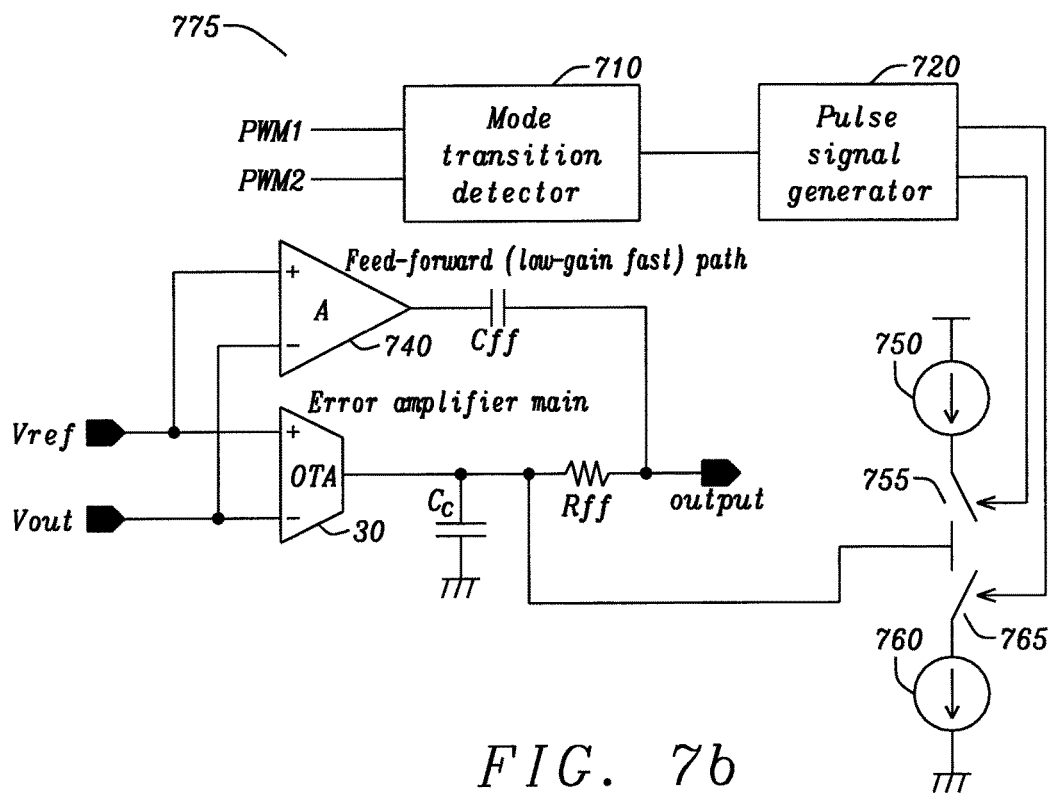
FIG. 7b illustrates 775, an alternative embodiment of the disclosure, for controlling the main compensation capacitor Cc of the Error Amplifier 30.

FIG. 7b illustrates 775, an alternative embodiment of the disclosure, for controlling the main compensation capacitor Cc of the Error Amplifier 30. Important elements include the mode transition detector 710, and charge/discharge circuitry, where the proposed mode transition detector 710 is composed of digital logic gates. The logic circuitry monitors the Buck and Boost PWM input signals, and detect skipping or regeneration of these signals, to determine which of the various mode transitions shown in FIG. 6 have occurred. The mode transition detector logic determines if a mode transition occurs, causing a pulse to be generated by pulse signal generator 720. The charge and discharge circuitry comprises PMOS current source 750, NMOS current source 760, and control switches for the current sources, 755 and 765, respectively. Error Amplifier 30 comprises an operational transconductance amplifier (OTA), and receives non-inverting input Vref and inverting input Vout, and supplies main compensation capacitor Cc. The output of the error amplifier is connected to the charge and discharge circuitry. Reference voltage Vref, feedback output voltage Vout, and input signals PWM1 and PWM2 correspond to signals of the same name in FIG. 4a.

In FIG. 7b, a feed-forward, low gain, fast path is connected across inputs Vref and Vout, and the output of the feed-forward path supplies feed-forward capacitor Cff. Feed-forward resistor Rff is connected across main compensation capacitor Cc, and feed-forward capacitor Cff. Output, read across feed-forward resistor Rff, is input to offset voltage 33, which supplies the PWM comparators. The low gain is a finite gain, and not limited by the gain stage topology of the alternative embodiment.

When the circuit receives a PWM signal indicating a mode transition, the pulse signal generator generates a pulse signal whose width is one clock cycle. This pulse signal causes one of the switches for the PMOS or NMOS current sources to be turned on. For the mode transition from Buck to Y2f Buck 630, from Buck to Buck-Boost 615 and 645, from Buck-Boost to Boost 620 and 650, and from ½f Boost to Boost 635, the switch for the PMOS current source is enabled, to charge the main compensation capacitor directly. For the mode transition from Boost to ½f Boost 630, from Boost to Buck-Boost 625 and 655, from Buck-Boost to Buck 610 and 640, and from ½f Buck to Buck 635, the switch for the NMOS current source is enabled, to discharge the compensation capacitor.

Figure 8A:
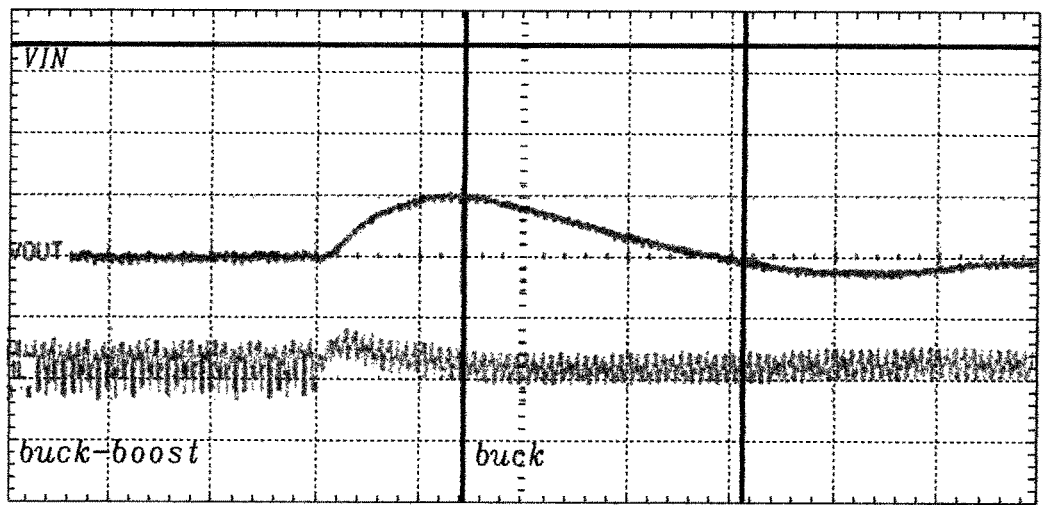
FIGS. 8a & 8b show mode transition waveforms, where a mode transition is caused when switching from Buck-Boost to Buck, both with and without the principles of the disclosure.
Figure 8B:
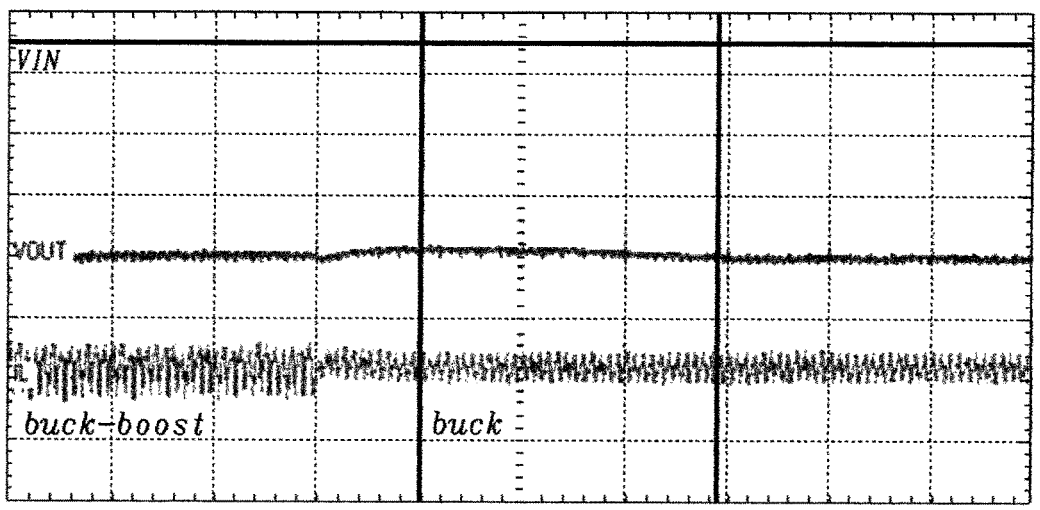

FIGS. 8a & 8b show mode transition waveforms 800, where a mode transition is caused when switching from Buck-Boost to Buck, both with and without the principles of the disclosure. In FIG. 8a, the overshoot is about 50 mV, without the proposed mode transition detector and pulse signal generator circuitry of the disclosure. In FIG. 8b, the overshoot during mode transition is less than 10 mV, with the proposed mode transition detector and pulse signal generator circuitry of the disclosure, a significant improvement.

Figure 9A:
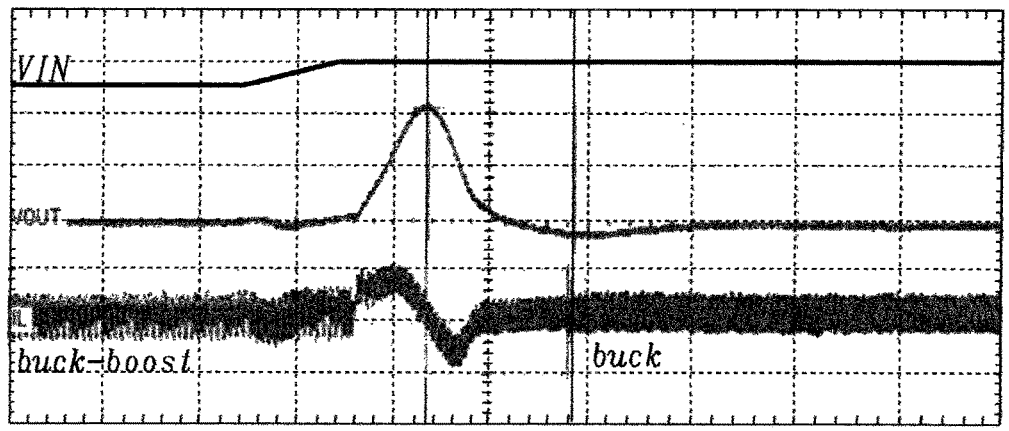
FIGS. 9a & 9b illustrate waveforms where a mode transition is caused by a line transient on the input voltage, causing a mode transition from Buck-Boost to Buck, with and without the principles of the disclosure.
Figure 9B:
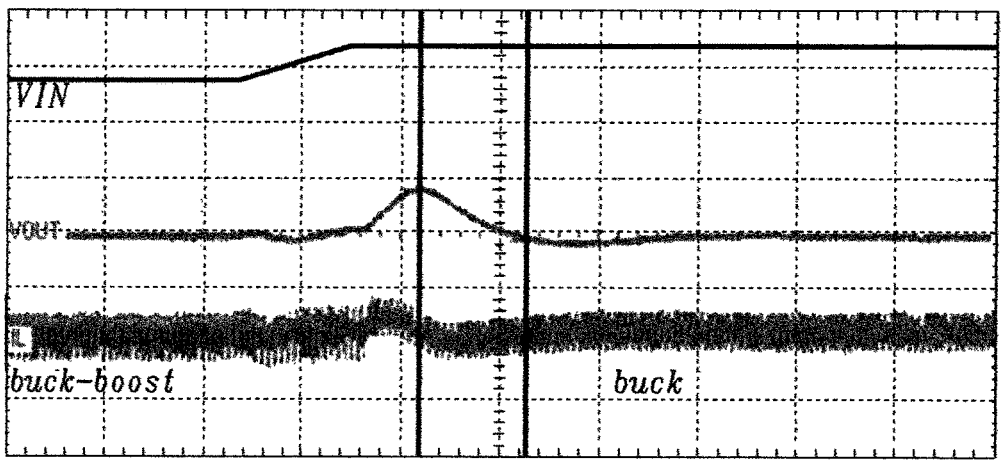

FIGS. 9a & 9b illustrate waveforms 900, where a mode transition is caused by a line transient on input voltage Vin, causing a mode transition from Buck-Boost to Buck, with and without the principles of the disclosure. The line transient is from 3.7V to 4.3V, within 10 uS, which is a general specification for mobile applications. In FIG. 9a, the overshoot on the output voltage is about 200 mV, without the proposed mode transition detector and pulse signal generator circuitry of the disclosure. In FIG. 9b, the overshoot on the output voltage is decreased to less than 100 mV, with the proposed mode transition detector and pulse signal generator circuitry of the disclosure, a significant improvement.

Figure 10:
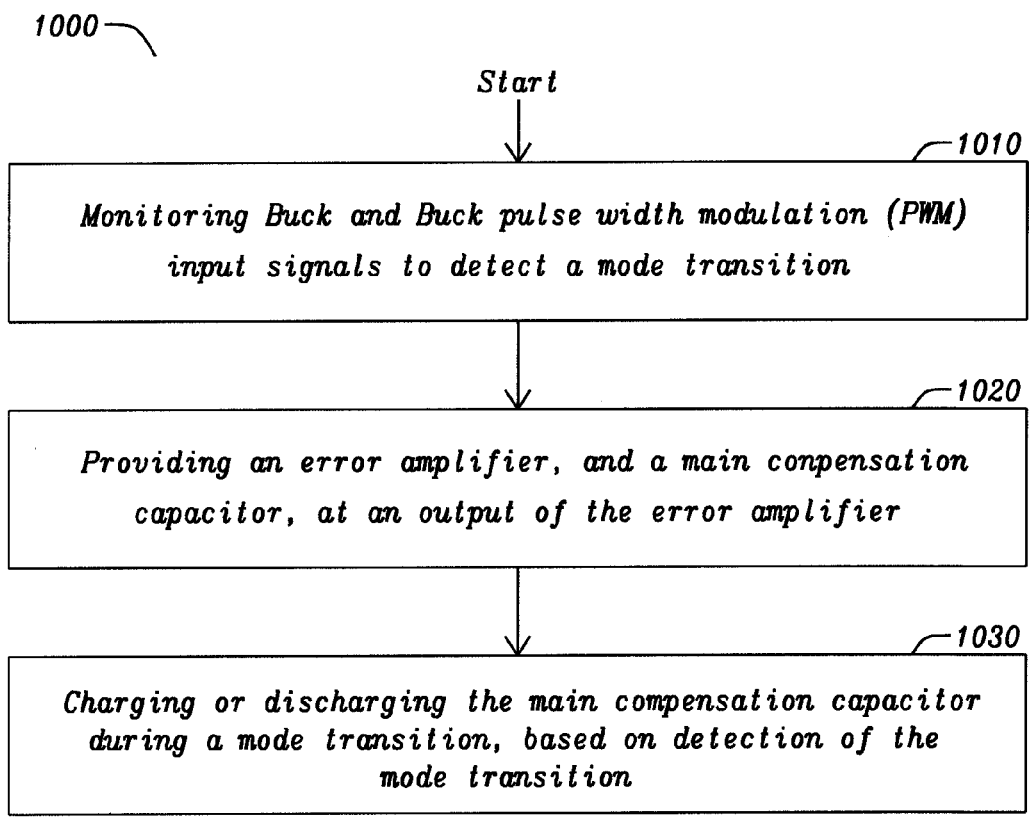
FIG. 10 is a flow chart of a method for operating a Buck-Boost switching converter, embodying the principles of the disclosure.

FIG. 10 is flow chart 1000 of a method for operating a Buck-Boost switching converter. The steps include monitoring Buck and Boost pulse-width modulation (PWM) input signals to detect a mode transition, in 1010. An error amplifier, and a main compensation capacitor at an output of the error amplifier, is provided in 1020. Charging or discharging the main compensation capacitor during a mode transition, based on detection of the mode transition, is provided in 1030.

The advantages of one or more embodiments of the present disclosure include making the output disturbance smaller during the mode transition among operation regions of the switching converter, in addition to reducing the risk of mode bounce between two operation modes. The proposed switching converter provides a power supply with a smaller overshoot and undershoots, allowing for no change in the frequency characteristic of the control loop. Because the control loop stability is not changed and an instability issue is not caused, a mode transition occurring during load and/or line transient does not cause the overshoot and undershoot to become significantly larger.

While this invention has been particularly shown and described with reference to the preferred embodiments thereof, it will be understood by those skilled in the art that various changes in form and details may be made without departing from the spirit and scope of the invention.

The invention claimed is:

1. A Buck-Boost switching power converter, comprising:
   a mode transition detector, configured to monitor Buck and Boost pulse-width modulation (PWM) input signals, and to detect skipping or regeneration of said input signals;
   an error amplifier;
   a main compensation capacitor, at an output of said error amplifier; and charge and discharge circuitry, comprising a PMOS current source, and a NMOS current source, configured to charge or discharge said main compensation capacitor during a mode transition, based on detection of said mode transition by said mode transition detector,
   wherein for a mode transition from Buck to ½frequency Buck, from Buck to Buck-Boost, from Buck-Boost to Boost, and from ½frequency Boost to Boost, said PMOS current source is configured to be on, and
   wherein for a mode transition from Boost to ½frequency Boost, from Boost to Buck-Boost, from Buck-Boost to Buck, and from ½frequency Buck to Buck, said NMOS current source is configured to be on.

2. The Buck-Boost switching power converter of claim 1, wherein said mode transition detector further comprises digital logic gates, configured to detect a mode transition between said PWM input signals.

3. The Buck-Boost switching power converter of claim 1, further comprising a pulse signal generator connected between said mode transition detector and said charge and discharge circuitry.

4. The Buck-Boost switching power converter of claim 3, wherein said pulse signal generator is configured to skip or regenerate said PWM input signals, during said mode transition.

5. The Buck-Boost switching power converter of claim 3, wherein said pulse signal generator is configured to output a pulse having a signal width of one clock cycle.

6. The Buck-Boost switching power converter of claim 1, wherein said main compensation capacitor is charged or discharged, such that said output of said error amplifier is shifted close to a target value.

7. The Buck-Boost switching power converter of claim 1, wherein said error amplifier comprises an operational transconductance amplifier.

8. The Buck-Boost switching power converter of claim 7, wherein said error amplifier is configured to receive inputs comprising a reference voltage and a feedback output voltage.

9. The Buck-Boost switching power converter of claim 8, further comprising a feed-forward gain path connected across said error amplifier inputs and having a feed-forward capacitor at its output.

10. The Buck-Boost switching power converter of claim 9, wherein a feed-forward resistor is connected across said main compensation capacitor and said feed-forward capacitor.

11. The Buck-Boost switching power converter of claim 10, wherein said main compensation capacitor is charged or discharged, such that said output of said error amplifier is shifted close to a target value across said feed-forward resistor.

12. The Buck-Boost switching power converter of claim 1, wherein said charge and discharge circuitry comprises control switches for said current sources.

13. The Buck-Boost switching power converter of claim 12, wherein said charge and discharge circuitry is configured such that one of said control switches for said PMOS or NMOS current sources is turned on.

14. A method for operating a Buck-Boost switching converter comprising the steps of:
    monitoring Buck and Boost pulse-width modulation (PWM) input signals to detect a mode transition, and skippinq or regenerating said input signals;
    providing an error amplifier, and a main compensation capacitor at an output of said error amplifier; and
    charging said main compensation capacitor with a PMOS current source for said mode transition from Buck to ½frequency Buck, from Buck to Buck-Boost, from Buck-Boost to Boost, and from ½frequency Boost to Boost or discharging said main compensation capacitor with a NMOS current source for said mode transition from Boost to ½frequency Boost, from Boost to Buck-Boost, from Buck-Boost to Buck, and from ½frequency Buck to Buck, based on detection of said mode transition.

15. The method of claim 14, further comprising a pulse signal generator that skips or regenerates said PWM input signals, during said mode transition.

16. The method of claim 15, wherein said pulse signal generator outputs a pulse having a signal width of one clock cycle.

17. The method of claim 14, wherein said main compensation capacitor charges or discharges, such that said output of said error amplifier shifts close to a target value.

18. The method claim 14, wherein said error amplifier receives inputs comprising a reference voltage and a feedback output voltage.

19. The method of claim 18, further comprising a feed-forward gain path connected across said error amplifier inputs and a feed-forward capacitor.

20. The method of claim 19, wherein a feed-forward resistor connects across said main compensation capacitor and said feed-forward capacitor.

21. The method of claim 20, wherein said main compensation capacitor charges or discharges, such that said output of said error amplifier shifts close to a target value across said feed-forward resistor.

* * * * *